(12) United States Patent
Decker

(10) Patent No.: US 6,361,574 B1
(45) Date of Patent: Mar. 26, 2002

(54) INTAKE AIR CLEANING APPARATUS

(75) Inventor: William K. Decker, Cambridge, WI (US)

(73) Assignee: American Farm Implement & Specialty, Inc., Janesville, WI (US)

( * ) Notice: Subject to any disclaimer, the term of this patent is extended or adjusted under 35 U.S.C. 154(b) by 0 days.

(21) Appl. No.: 09/528,349

(22) Filed: Mar. 17, 2000

(51) Int. Cl.[7] ............................................. B01D 45/14
(52) U.S. Cl. ............................ 55/317; 55/320; 55/337; 55/404; 55/447
(58) Field of Search ..................... 55/337, 430, 447, 55/456, 317, 320, 323, 404, 440, 492

(56) References Cited

U.S. PATENT DOCUMENTS

| | | |
|---|---|---|
| 1,641,746 A | 9/1927 | Donaldson |
| 1,870,216 A | 8/1932 | Baldwin |
| 2,193,479 A | 3/1940 | Donaldson |
| 2,304,778 A | 12/1942 | Cresswell |
| 2,417,130 A | 3/1947 | Russell |
| 2,973,830 A | 3/1961 | Gruner |
| 2,973,833 A | 3/1961 | Cook |
| 3,508,383 A * | 4/1970 | Humbert, Jr. et al. |
| 3,552,102 A | 1/1971 | Araki |
| 3,670,480 A | 6/1972 | Petersen |
| 3,740,932 A | 6/1973 | Bersheim |
| 3,791,112 A | 2/1974 | Lidstone .................. 55/337 |
| 3,864,109 A * | 2/1975 | Hansen ..................... 55/324 |
| 3,973,937 A | 8/1976 | Petersen ................... 55/449 |
| 4,013,137 A | 3/1977 | Petersen ................... 55/342 |
| 4,135,897 A | 1/1979 | Gondek .................... 55/404 |
| 4,138,761 A | 2/1979 | Nauta ....................... 55/413 |
| 4,169,059 A | 9/1979 | Storms |
| 4,197,102 A | 4/1980 | Decker ..................... 55/449 |
| 4,201,557 A | 5/1980 | Peterson .................. 55/327 |
| 4,227,898 A * | 10/1980 | Kamekawa et al. ....... 55/337 |
| 4,248,613 A | 2/1981 | Linhart ..................... 55/394 |
| 4,373,940 A | 2/1983 | Peterson .................. 55/328 |
| 4,459,141 A | 7/1984 | Burrington, et al. ...... 55/391 |
| 4,547,207 A | 10/1985 | Petersen .................. 55/394 |
| 4,941,900 A | 7/1990 | Cordes ..................... 55/319 |

(List continued on next page.)

FOREIGN PATENT DOCUMENTS

| | | |
|---|---|---|
| FR | 683986 | 6/1930 |
| GB | 2064359 | 6/1981 |
| IT | 483058 | 7/1953 |

OTHER PUBLICATIONS

Advertising for Best–Ex Centri Air Pre–Cleaners, by Best–Ex, Inc. before 1990.

Photocopy of cutaway view of the Centri Air Pre–Cleaner sold by Best–Ex, Inc, no date given.

(List continued on next page.)

*Primary Examiner*—David A. Simmons
*Assistant Examiner*—Frank M. Lawrence
(74) *Attorney, Agent, or Firm*—Foley & Lardner

(57) ABSTRACT

Intake air cleaning apparatus includes a filter canister with a filter mounted therein to filter air passing from an inlet end of the canister to an outlet end. A hood is mounted to the filter canister at the inlet end and has a discharge port for discharging particulates. A series of vanes are mounted in a gap between the hood and the inlet end of the filter canister to define channels through which air is directed into the air space between the hood and canister inlet end. A rotor mounted within the air space flings particulates toward the hood for expulsion through the discharge port. The filter within the canister may be formed of an outer cylindrical filter and an inner cylindrical filter mounted to the outlet wall of the canister to filter the precleaned air that passes through an inlet opening of the canister into the air space between the interior of the canister and the outer filter. Highly efficient cleaning of the intake air for internal combustion engines and the like is thus provided in a compact unit.

22 Claims, 3 Drawing Sheets

U.S. PATENT DOCUMENTS

| | | | |
|---|---|---|---|
| 4,976,857 A | | 12/1990 | Solomon |
| 5,022,903 A | | 6/1991 | Decker .................. 55/404 |
| 5,035,797 A | * | 7/1991 | Janik .................... 210/232 |
| 5,059,222 A | | 10/1991 | Smith |
| 5,178,760 A | | 1/1993 | Solberg, Jr. |
| 5,320,653 A | * | 6/1994 | Morgan et al. ............ 55/337 |
| 5,449,391 A | | 9/1995 | Decker .................. 55/404 |
| 5,505,756 A | | 4/1996 | Decker .................. 55/399 |
| 5,656,050 A | | 8/1997 | Moredock |
| 5,766,315 A | | 6/1998 | Moredock |
| D422,069 S | | 3/2000 | Decker |
| 6,264,712 B1 | | 7/2001 | Decker .................. 55/456 |

OTHER PUBLICATIONS

Advertisement, Price List and Specifications for Turbo® Pre–Cleaners by Sureco, Mar. 1, 1987.

Advertisement for Turbo® III Precleaners by Dreison International, 1999.

Brochure entitled "Enginaire," 1998, describing air pre-cleaners on the market in the United States more than one year before the filing date of the present application.

Kate Miller, "Sy–Klone Makes the Best Better," OEM Off Highway, Jan. 1996, pp. 34, 36.

Advertising by Vergis Filter for Spare Parts for Air Filters "FR" Series, published prior to 2000.

Advertising by Nelson for Air Intake Components—Plastic Air Cleaners, published prior to 2000.

Advertising by Donaldson for FHG Cyclopac FHG Service Parts, published prior to 2000.

Advertising by Donaldson for FPG RadialSeal FPG Service Parts, published prior to 2000.

Advertising by Donaldson for F Series: 2 Stage Air Cleaners, published prior to 2000.

Advertising by Mann & Hummel for "Plastic Model" air cleaner, published prior to 2000.

Copy of patent application Ser. No. 09/450,647, filed Nov. 19, 1999, by Charles Solberg, Jr. and William Decker, for Multiple Stage Air–Intake Filter Apparatus, Examiner R. Hopkins.

* cited by examiner

INTAKE AIR CLEANING APPARATUS

FIELD OF THE INVENTION

This invention relates generally to devices for separating and removing particulates from the air such as dirt, dust, rain, and snow, before they enter the air stream of an engine, air compressor, or similar apparatus.

BACKGROUND OF THE INVENTION

Air filters are conventionally used to filter air being drawn into an internal combustion engine. Air precleaners are devices used to remove dust, dirt, sand, rain, snow, and other airborne particulates in the intake air prior to the flow of air through the filter. Precleaners promote more efficient combustion and longer engine and filter life. The efficiency of the precleaner is determined by the percentage of particulates that are removed from the intake air by the precleaner. The more efficient the precleaner, the lesser the amount of particulates that must be removed by the air filter.

The precleaners of the prior art have various configurations that are employed as a means of removing the particulates from the air. Examples of precleaners or particle separators are shown in U.S. Pat. Nos. 2,193,479; 2,304,778; 2,417,130; 2,973,830; 3,552,102; 3,670,480; 3,740,932; 3,791,112; 3,973,937; 4,138,761; 4,197,102; 4,547,207; 5,022,903; 5,449,391; and 5,505,756.

Although such precleaners may adequately perform with respect to particulate removal, this is sometimes accomplished at the expense of a reduced air flow, i.e., the precleaner itself may become an air restriction. There is generally a trade-off between efficiency of particulate renewal and air intake restriction.

Precleaners for use with motor vehicles are typically mounted on a stack that extends above the hood of a vehicle. The air filter is usually mounted under the hood near the carburetor or intake manifold. Attempts have been made to mount the precleaner and filter adjacent to one another utilizing precleaners with conventional bottom air intake, thus requiring that the precleaner still be spaced a distance from the filter canister which is sufficient to permit free flow of air to the precleaner.

SUMMARY OF THE INVENTION

The intake air cleaning apparatus in accordance with the invention provides highly efficient cleaning of intake air for internal combustion engines and the like with low air flow restriction. The apparatus of the invention provides removal and discharge of particulates from the intake air as well as thorough air filtering in a compact unit that is well adapted to be mounted within the engine compartment of a vehicle. Because of the compactness of the apparatus, it does not occupy significantly greater space than a conventional air filter unit. The apparatus is formed so that it can be readily disassembled in part to allow access to filters for cleaning and replacement.

The intake air cleaning apparatus in accordance with the invention preferably includes a filter canister and a filter mounted therein. The filter canister has an inlet end with an air inlet opening and an outlet end with an air outlet opening. A filter is mounted in the canister to filter the air flowing from the inlet opening to the outlet opening. A hood is mounted to the filter canister at the inlet end thereof and has a discharge port for discharging particulates. The hood and inlet end of the filter canister define an air space. A circumferential gap is defined between the hood and the filter canister. A series of vanes are mounted in the gap at an angle between radial and tangential to define channels between them through which air is directed into the air space. A rotor assembly is mounted within the air space to fling particulates toward the hood for expulsion through the discharge port. Because the air intake is through the gap between the hood and the inlet end of the filter canister, rather than through the bottom of the hood as in conventional air precleaners, the hood can be mounted to the filter canister to provide a compact and rugged one-piece unit.

The filter canister preferably has a cylindrical outer wall, an inlet end wall defining the inlet end with the inlet opening therein, and an outlet end wall defining the outlet end with the outlet air opening therein. The filter is preferably cylindrical and has a closed top end and an open bottom end which is in communication with the outlet opening of the canister. An outermost surface of the cylindrical filter is spaced inwardly from the cylindrical outer wall of the canister to define an air space that is in communication with the inlet opening of the canister such that air flowing into the inlet opening of the canister flows into the air space and then through the cylindrical filter to the outlet opening of the canister. The cylindrical wall of the canister is preferably formed in two separable parts comprising an upper section and a lower section. Clamps mounted to one of the sections provide a means for releasably joining the upper section and the lower section together. When the filter is to be cleaned or replaced, the operator can readily open the clamps to allow the top portion of the canister with the hood mounted thereto to be separated from the bottom portion of the canister, exposing the filter. When the filter has been cleaned or replaced, the top section of the canister with the hood attached thereto can be assembled back into place on the bottom section of the canister and the clamps manipulated to hold the two sections of the canister tightly together.

The filter preferably is formed into two parts, including an outer cylindrical coarse filter having an outer surface and an inner surface, and a cylindrical inner filter having an outer surface with a diameter smaller than the inner surface of the outer filter. The cylindrical interior of the inner filter is in communication with the outlet opening of the canister. The outer cylindrical filter has a closed top end and an open bottom end which is engaged with the outlet wall of the canister to provide an air tight seal.

The intake air cleaning apparatus of the invention thus carries out in a single unit the functions conventionally performed by a separate air precleaner and air filter. The apparatus is particularly adapted to be mounted within the engine compartment of a vehicle. If desired, the apparatus may also be mounted as a unit outside the engine compartment of a vehicle, e.g., at the top of the stack pipe. In use, air is drawn in through the gap and between the vanes and is directed upwardly within the hood to propel the rotor to fling particulates through the discharge port in the hood. The precleaning of the particulates from the air reduces the volume of material that must be cleaned from the air by the filters, extending filter life. The intake air then passes through the inlet opening of the filter canister and into the air space between the cylindrical canister wall and the outer cylindrical surface of the outer coarse filter. The outer cylindrical filter may have a large aspect ratio—the ratio of height to diameter—providing a large area through which air can be drawn into the outer filter, thereby minimizing the air flow restriction associated with the passage of air through the outer filter. Similarly, the inner filter preferably has a large aspect ratio and a relatively large area over which air may be drawn in through the material of the inner filter and thence to the outlet opening of the canister. The use of both an outer filter and an inner filter allows different materials to be used in the inner filter and outer filter, with the outer filter being formed of a filter material which can readily collect relatively larger dirt and dust particles, moisture, oils, and so forth, to prevent such materials from passing to the inner filter, which may be formed of a material which provides finer filtering but would otherwise be more easily clogged by the material that has been removed by the outer filter.

Further objects, features and advantages of the invention will be apparent from the following detailed description which taken in conjunction with the accompanying drawings.

DETAILED DESCRIPTION OF THE INVENTION

Figures 1, 2, 3:
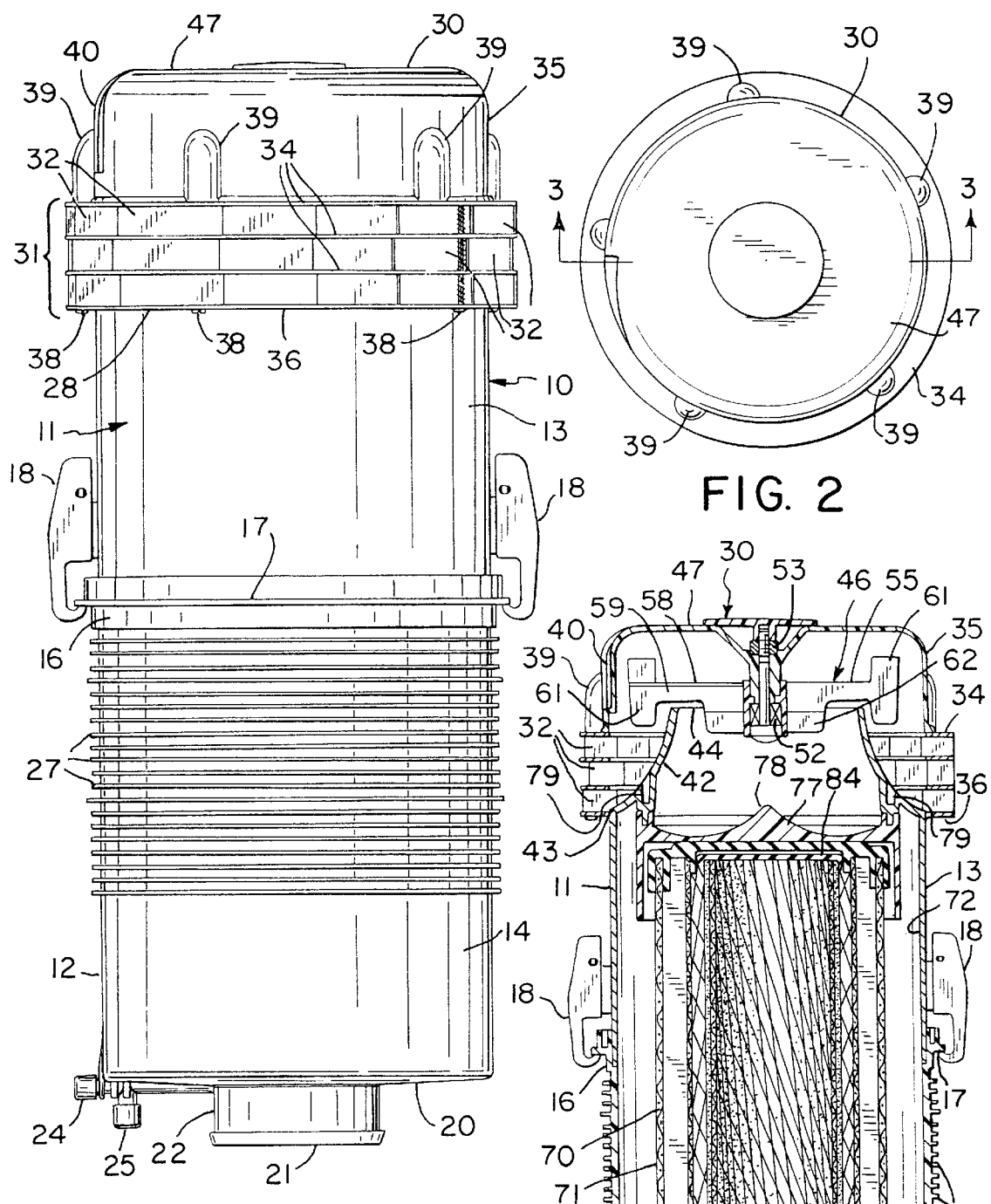
FIG. 1 is a side view of intake air cleaning apparatus in accordance with the invention.
FIG. 2 is a top view of the intake air cleaning apparatus.
FIG. 3 is a cross-sectional view through the intake air cleaning apparatus taken generally along the lines 3—3 of FIG. 2.

With reference to the drawings, intake air cleaning apparatus in accordance with the invention is shown generally at 10 in FIG. 1. The apparatus 10 combines the functions of an air precleaner and an air filter in a single compact, rugged unit. It is well adapted to be mounted in the engine compartment of a vehicle such as a truck, tractor or large construction equipment, at the position at which an air filter by itself is conventionally mounted. Because of the compactness and rugged construction of the cleaning apparatus 10, it does not require any special modifications to allow it to be mounted in place of a conventional air filter unit.

The apparatus 10 includes a filter canister 11 preferably having a generally cylindrical outer wall 12 divided into an upper section 13 and a lower section 14. The two section 13 and 14 are joined together at a fitting 16 which is formed with a slightly larger inner diameter to allow a portion of the upper section 13 to be inserted therein. A flange 17 extents outwardly from the top periphery of the lower section 14 and can be engaged by manipulation of clamps 18 mounted on the upper section 13 to provide a means for releasably joining the upper section 13 to the lower section 14 to complete the cylindrical canister. The bottom of the canister 11 is closed by a bottom wall 20 which has a outlet opening 21 formed by an extension sleeve 22 which is adapted to fit over the air intake pipe, for example, of an internal combustion engine for a vehicle. The air cleaning apparatus of the invention may also be used in other applications where intake air cleaning is required, such as for stationary internal combustion engines and large air compressors.

A hand-operable screw 24 is mounted to the bottom of the canister section 14 and can be screwed down to press the end of the screw (not shown) against a pipe inserted into the sleeve 22. A second perpendicular screw 25 can be manipulated to lock the screw 24 in place. Any other means may be used for connecting the filter canister to the air inlet pipe, including strap type clamps, multiple screws, etc. In an appropriate case a friction fit may be utilized or the pipe may be permanently fixed to the filter canister. Reinforcing ribs 27 may be formed as illustrated on the periphery of the lower canister section 14, if desired, to provide structural reinforcement.

The filter canister 11 has an inlet end 28 to which is mounted a hood 30. The hood 30 is spaced from the inlet end 28 of the canister 11 to define a circumferential gap 31. The board 30 and inlet end 28 of the canister define an air space. A series of vanes 32 are preferably mounted in the gap 31 at an angle between radial and tangential to define channels between them through which air is directed into an air space defined between the hood and the inlet end of the filter canister. As described further below, the vanes 32 are mounted to a flange 34 which extends outwardly from the periphery of the outer cylindrical side wall 35 of the hood 30 and, if desired, vanes 32 are mounted to additional flanges 34, as discussed further below, which are mounted between a flange 36, extending outwardly from the top periphery of the inlet end of the filter canister, and the bottom edge of the cylindrical side wall of the hood. As discussed further below, threaded bolts 38 may be utilized to secure the flanges 34 and vanes 32 in place and to further securely attach the hood 30 to the filter canister 11. The bolts 38 may thread through the flanges 34 into tapped receptacles 39 on the hood 30. The hood 30 has a discharge port 40 which may be formed as a slot in the cylindrical sidewall 35 of the hood for discharging particulates from the hood, as discussed further below.

The cross sectional view of FIG. 3 shows the operative parts of the cleaning apparatus in the air flow path from entry of the air through the channels defined between the vanes 32 to the discharge of the air through the outlet port 21 of the filter canister. Each of the vanes 32 in the series is preferably spaced uniformly from adjacent vanes around the gap 31 to define air channels between adjacent vanes to provide side air injection. As an example, the vanes may be oriented at an angle of about 35° with respect to a tangent to the circular periphery of the hood (e.g., the periphery of the flange 34), although larger or smaller angles may be utilized (e.g., 20° to 60° or more). The vanes direct air inwardly and tangentially, and the air is directed upwardly by an inlet end wall 42 of the filter canister. The inlet end wall 42 is preferably curved as shown, and slopes inwardly and upwardly from a junction 43 with the cylindrical outer wall 11 of the filter canister to a circular inlet opening 44 of the canister. A rotor assembly 46 is rotatably mounted in the hood air space, for example, to the top wall 47 of the hood 30, and functions to fling particulates toward the hood for expulsion through the discharge port 40. The rotor assembly 46 comprises a hub 50 mounted to a bearing 52 which is itself secured by a bolt 53 to the top wall 47 of the hood. A plurality of arms 55 (preferably four arms 55 in an X-configuration, with two shown in FIG. 3) extend radially from the hub 52. More or less than four arms 55 may be used. A preferred rotor assembly is of the type generally shown and described in U.S. Pat. Nos. 5,449,391 and 5,505,756. Each of the arms 55 has a first blade 58 and a second blade 59. The first blades 58 are in a plane radial to the hub 50, that is, a plane perpendicular to the axis of rotation of the rotor, and the second blades 59 are preferably in planes axial to the hub 50, that is, planes parallel to and preferably coincident with the axis of rotation. The first blades 58 have a leading edge and a trailing edge, where the leading edge proceeds the trailing edge as each arm moves along its circular path of rotation. The first blades 58 are preferably wedge shaped, being widest at the position at which they join the hub 50 and tapering to a terminus of the leading edge at a position adjacent to paddles 61 formed at the outer ends of the arms. The second blade 59 descends preferably perpendicularly from the trailing edge of the first blade 58 and has a front side and a back side. Where the rotor is formed to rotate counterclockwise, the first blade 58 protrudes from the front side of the second blade 59 in a counterclockwise direction, whereas the backside of the second blade is free of obstruction, and thus air flowing past the backside is substantially unobstructed. The arms 55 may also have an integrally formed tab 62 that extends downwardly from the axial blade 59 in a manner as depicted in FIG. 3. The tabs 62 extend downwardly toward the throat defined by the circular inlet opening 44 of the filter canister inlet end. The tabs 62 may be slightly bent or flared in a clockwise direction or may extend downwardly in an axial plane without a bend. A bent tab can be advantageous at high altitudes where the angle of the tabs may be increased to compensate for the lower intake air pressure and thereby maintain the rotational speed of the rotor assembly at a desired high rate despite the low air density. Further considerations for the design of the rotor are described in the foregoing U.S. Pat. Nos. 5,449,391 and 5,505,756.

In operation, air that may contain particulate matter is drawn in through the gap 31 through the channels between the vanes 32 by vacuum pressure caused by an engine or similar device connected to the air outlet 21 of the filter canister. The angling of the vanes 32 directs the air flow in a circular, counterclockwise direction within the air space defined between the inlet end of the filter canister—particularly the inlet end wall 42—and the hood 30. The air flow is directed against the blades 58 and 59, and the tabs 62, of the rotor assembly 46, thus causing the rotor assembly 46 to spin in a counterclockwise direction. The rotor assembly could be formed so that the direction of rotation could be clockwise if desired. The circular motion of the rotor assembly 46 propels the air into a circular motion causing a centrifugal force to be exerted on particulates within the air that had been drawn in. The particulates are thus flung outwardly against the inner cylindrical surface of the sidewall 35 of the hood. The configuration of the hood 30 forces particulates along the interior of the hood surface toward the vertically extending slot that forms the discharge port 40. Other discharge port configurations may be used, examples of which are illustrated in U.S. Pat. Nos. 5,022,903, 5,449,391, and 5,505,756. This action serves to pre-clean the intake air of the heavier particulate materials before the air is filtered.

Figure 4:
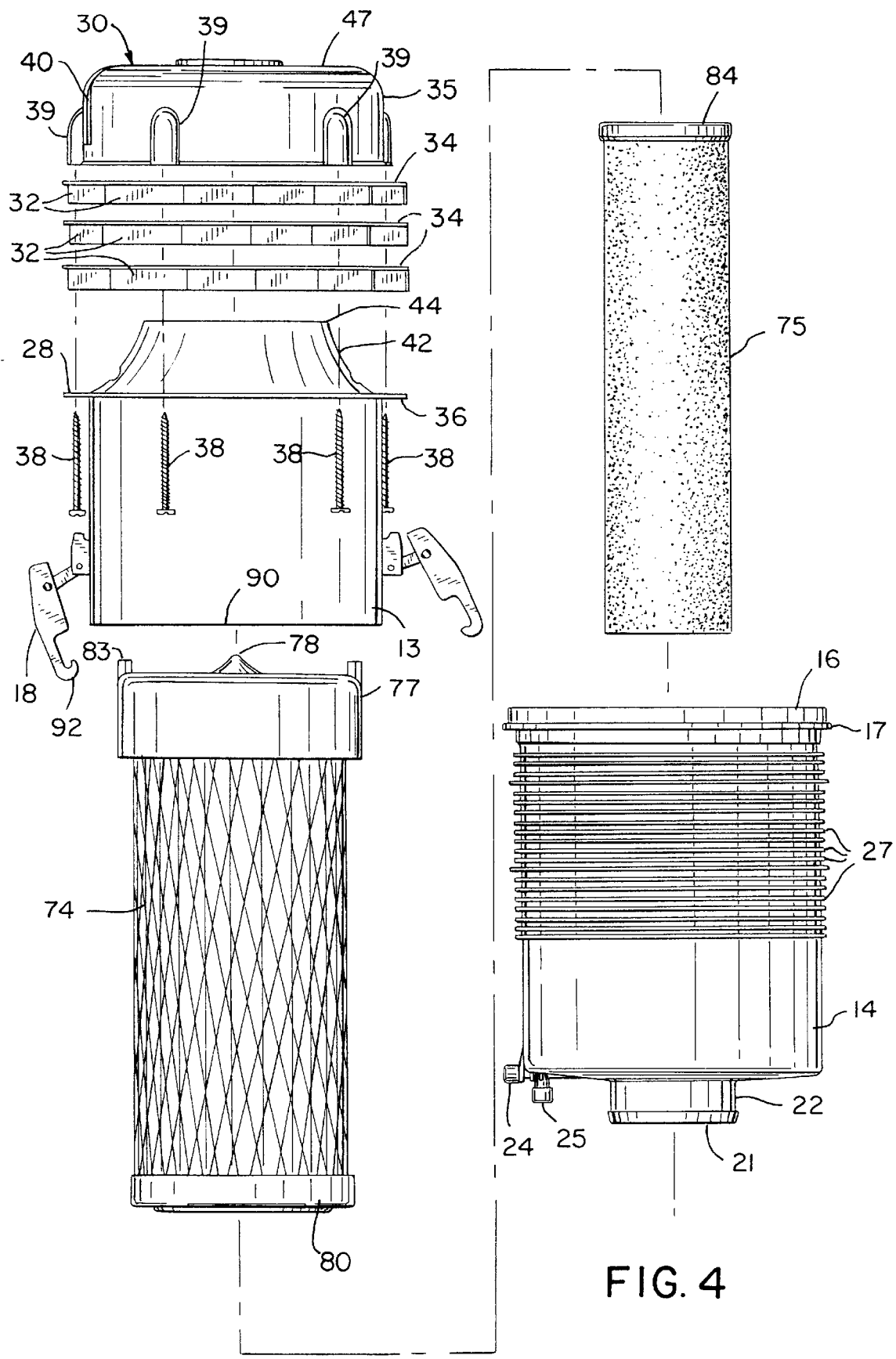
FIG. 4 is an exploded view of the intake air cleaning apparatus of the invention showing the relative placement of parts and the assembly thereof into the completed apparatus.

The flanges 34 may be formed separately from the hood 30, e.g., each as a circular ring, and a series of equally spaced vanes 32 may be attached to each of the flanges 34, for example, by being molded therewith of durable plastic. A single one of the flanges 34 with the vanes 32 attached thereto may be mounted to the hood 30 where a single layer of vanes will provide adequate air intake. An advantage of separate flange rings 34 with a series of vanes 32 attached thereto is that a selected number of such separate units may be stacked together in the manner best illustrated in FIG. 4, which illustrates the assembly of the device. However, it is understood that more or less of the flange and vane units may be utilized. The number of units used in a stack may be selected to provide a desired total air intake area, which is a significant factor in the restriction of air being drawn into the air precleaner. The flange and vane units may be standardized for specific application which requires a particular number of units in the stack, and may be simply assembled from the standard parts. As illustrated in FIG. 4, the units comprising a flange ring 34 and vanes 32 may be formed so that the bolts 38 may be threaded through each of the units and into the hood, such as at the tapped receptacles 39 on the hood.

As illustrated in the cross-sectional view of FIG. 3, a filter 70 is mounted within the interior of the filter canister 11 to filter the air flowing from the inlet opening 44 to the outlet opening 21. The filter 70 is preferably cylindrical and has an outer surface 71 spaced inwardly from the inner surface 72 of the cylindrical wall of the filter canister to define an air space that is in communication with the inlet opening 44 of the canister. Air flowing into the inlet opening of the canister flows into the air space and thence through the cylindrical filter 70 to the outlet opening 21.

Figure 5:
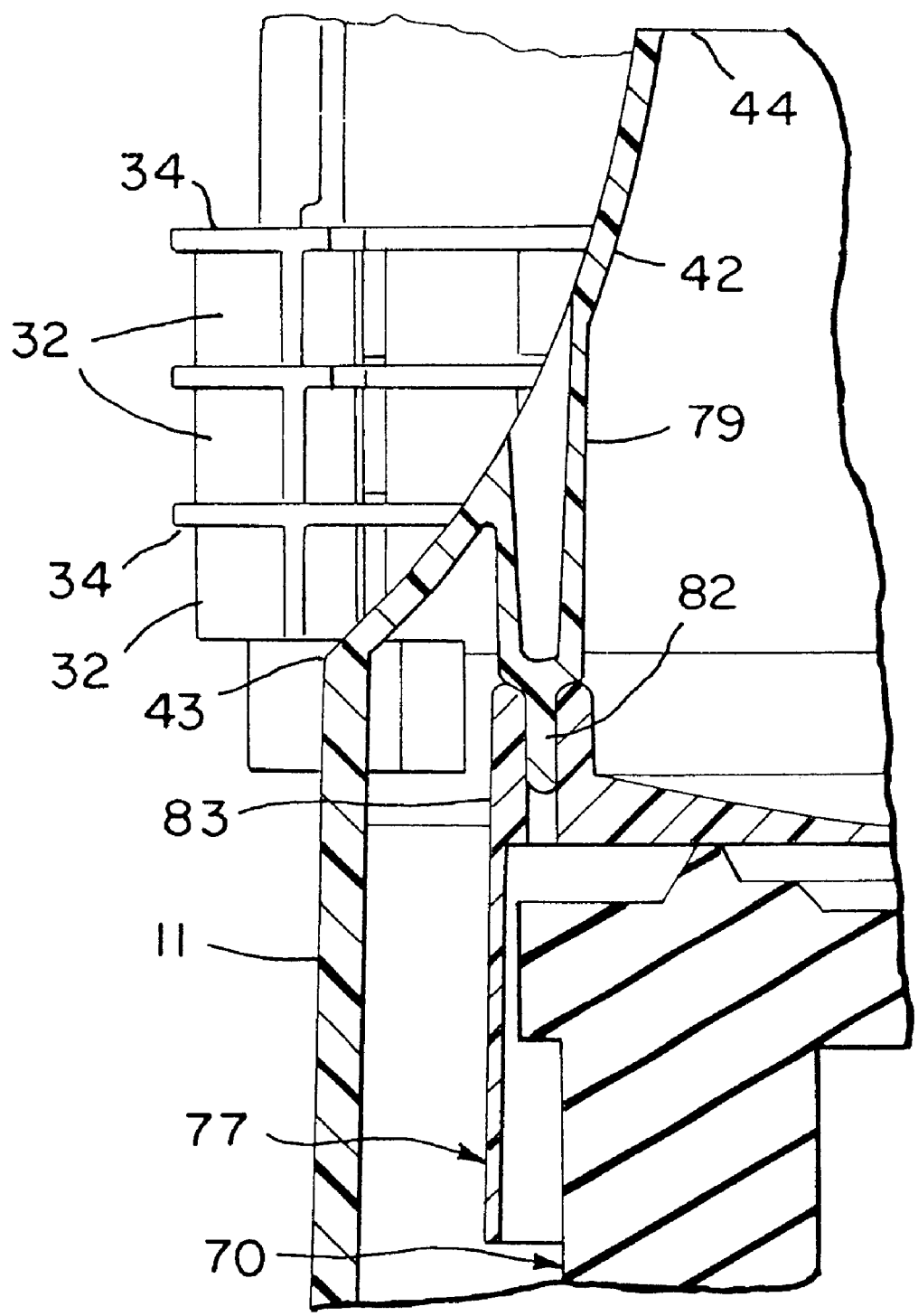
FIG. 5 is a cross-sectional view similar to FIG. 3 of a portion of the intake air cleaning apparatus showing a preferred structure for the support of the top of the air filter.

For the most efficient cleaning of the air by the filter 70, it is preferable that the filter 70 be formed of two parts, an outer cylindrical coarse filter 74 and an inner cylindrical fine filter 75. The inner filter 75 has an outer diameter which is smaller than the inner diameter of the outer filter 74 and thus is spaced inwardly therefrom. The outer cylindrical filter 74 has a top wall 77 which closes the open top of the cylindrical filter and forces air flowing into the filter canister through the inlet opening 44 into the air space between the cylindrical sidewall of the outer filter 74 and the inner wall of the cylindrical filter canister. As shown in FIG. 3, the top wall 77 preferably has a central peak 78 which then slopes away therefrom at least partially toward the outer periphery of the outer cylindrical filter, to direct air flowing into the canister through the inlet opening outwardly to the air space between the outer surface of the outer cylindrical filter and the inner surface of the cylindrical wall of the canister. Standoffs 79 may be formed in the top wall 42 of the canister as shown in FIG. 3, and in the detailed view of FIG. 5, that extend downwardly and terminate in a peg 82 that engages with a receptacle in an upright extension 83 of the top wall 77 of the filter to help hold the filter in its proper position. The bottom 80 of the outer cylindrical filter is preferably open and engages into a cylindrical sleeve 81 which extends upwardly from the outlet end wall 20 of the filter canister. The bottom end 80 of the outer filter preferably tightly engages within the sleeve 81 to form a substantially air tight seal so as to force air being drawn into the filter canister to flow through the outer filter. The outer filter may be a coarse filter formed of pleated filter paper in a conventional manner to filter out larger dust particles, moisture, grease, etc. while minimizing the restriction of air flow through the outer filter.

The inner filter 75 also preferably is cylindrical, closed at its top by a top wall 84, with an open bottom which engages over an upwardly extending sleeve section 85 to form a substantially air tight seal. The inner cylindrical filter 75 may be formed of a material such as a plastic foam which is well adapted to filter out the finest particles, but which might be subject to clogging and a reduction of efficiency if the larger particular matter and moisture, etc. were not previously removed by the outer filter 74. Of course, a single filter unit may be used if desired, or additional filters may be employed as desired. The filter 70 composed of the outer filter 74 and inner filter 75 may be a commercially available filter system, such as cylindrical filters available from Nelson under the name Dual Seal™, and from Donaldson, Virgis Filters and others.

The walls and other structural parts of the hood 30 and of the canister 11 may be formed of suitable materials such as aluminum, other metals, and plastics. A suitable plastic out of which these structures may be molded is glass filled acetyl plastic.

Assembly of the air intake cleaning apparatus of the invention is illustrated with respect to the exploded view of FIG. 4. The upper section 13 and lower section 14 of the filter canister are separated from one another as shown. The inner cylindrical filter 75 may then be inserted into place within the lower filter canister section 14, followed by the outer filter 74 which is fitted into its position within the lower filter canister section 14 around the inner filter 75. The hood 30 and the flanges 34 and vanes 32 are shown separated from the upper filter canister section 13 in FIG. 4, to illustrate the form of assembly of these units, but it is understood that after assembly these parts would be secured to one another by the bolts 38 which extend through the flanges 34 and thread into the tapped receptacles 39 to tightly secure the hood and the flanges with vanes thereon to the upper section 13 of the filter canister. After the inner filter 75 and outer filter 74 are mounted in place within the lower filter canister section 14, the outer filter canister section 13 with the hood 30 secured thereto may then be fitted into place with the bottom end 90 of the upper filter canister section 13 inserted into the fitting 16 and with the clamps 18 then being manipulated to engage the hooked ends 92 of the clamps 18 over the flange 17 to join the upper canister section 13 to the lower canister section 14. Conversely, when the filters 75 and 74 are to be cleaned or replaced, an operator can simply manipulate the clamps 18 to release the clamps from engagement with the flange 17, allowing the upper filter canister 13 with the hood 30 secured thereto to be pulled upwardly from the lower filter canister section, allowing access to the filters 74 and 75. In this manner, an operator or maintenance worker can easily and quickly manipulate the clamps 18 to open up the filter canister to allow access to the filters to change them or clean them.

It is understood that the invention is not limited to the particular embodiments set forth herein as illustrative, but embraces all such modified forms hereof as come within the scope of the following claims.

What is claimed is:

1. Intake air cleaning apparatus comprising:
    (a) a filter canister and a filter mounted therein, the filter canister having an inlet end with an air inlet opening therein and an outlet end with an air outlet opening therein, the filter mounted in the canister to filter the air flowing from the inlet opening to the outlet opening;
    (b) a hood mounted to the filter canister at the inlet end and having a discharge port for discharging particulates, the hood and inlet end of the filter canister defining an air space, a circumferential gap between the hood and the filter canister, and a series of vanes mounted in the gap at an angle between radial and tangential to define channels between them through which air is directed into the air space; and
    (c) a rotor assembly that is rotatably mounted within the air space to fling particulates toward the hood for expulsion through the discharge port.

2. The intake air cleaning apparatus of claim 1 wherein the filter canister has a cylindrical outer wall, an inlet end wall mounted to one end of the cylindrical outer wall and defining the inlet end with the inlet opening therein, and an outlet end wall mounted to the other end of the cylindrical outer wall and defining the outlet end with the outlet opening therein, wherein the filter is cylindrical and has a closed top end and an open bottom end which is in communication with the outlet opening of the canister, an outermost surface of the cylindrical filter spaced inwardly from the cylindrical outer wall of the canister to define an air space that is in communication with the inlet opening of the canister such that air flowing into the inlet opening of the canister flows into the air space and thence through the cylindrical filter to the outlet opening of the canister.

3. The intake air cleaning apparatus of claim 2 wherein the cylindrical wall of the canister is formed in two separable parts comprising an upper section and a lower section and including means for releasably joining the upper section and the lower section.

4. The intake air cleaning apparatus of claim 2 wherein the inlet end wall of the canister slopes upwardly from a junction with the outer cylindrical wall of the canister to a central circular opening defining the inlet opening of the canister.

5. The intake air cleaning apparatus of claim 2 wherein the inlet end wall is curved and slopes inwardly and upwardly from a junction with the cylindrical outer wall to a circular opening defining the inlet opening of the canister.

6. The intake air cleaning apparatus of claim 2 wherein the filter comprises an outer cylindrical coarse filter having an outer surface and an inner surface and a cylindrical inner filter having an outer surface of a diameter smaller than that of the inner surface of the outer filter, the inner filter having a cylindrical interior which is in communication with the outlet opening of the canister.

7. The intake air cleaning apparatus of claim 6 wherein the outer cylindrical filter has an open circular bottom which is engageable with an inner surface of the outlet end wall of the canister to provide an air seal and further having a top wall closing the top end of the outer cylindrical filter so that air entering the canister from the inlet opening flows through the outer cylindrical filter and thence through the inner cylindrical filter and thence to the outlet opening of the canister.

8. The intake air cleaning apparatus of claim 7 wherein the top wall of the outer cylindrical filter has a central peak and slopes downwardly therefrom to direct air flowing into the canister through the inlet opening outwardly to the air space between the outer surface of the outer cylindrical filter and the inner surface of the cylindrical wall of the canister.

9. The intake air cleaning apparatus of claim 2 wherein canister includes a flange extending outwardly from the periphery of the outer cylindrical wall at the inlet end of the canister.

10. The intake air cleaning apparatus of claim 2 wherein there are a plurality of flanges with a series of vanes attached to each flange, and wherein the plurality of flanges with vanes attached thereto are mounted in stacked relation in the gap.

11. The intake air cleaning apparatus of claim 1 wherein the vanes in the series of vanes are equally spaced from on another around the periphery of the gap to define inwardly converging channels between the vanes.

12. The intake air cleaning apparatus of claim 11 wherein each vane is formed of a flat plate.

13. The intake air cleaning apparatus of claim 1 wherein the hood has a cylindrical shaped sidewall and the discharge port is formed as a slot in the sidewall.

14. The intake air cleaning apparatus of claim 1 wherein the rotor assembly is mounted to the inside of the hood at a position above the position of the gap.

15. The intake air cleaning apparatus of claim 1 wherein the rotor assembly further includes an axle mounted to the hood, a hub that is rotatably mounted on the axle, and an arm that is attached to the hub in the path of air entering through the channels between the vanes, the air causing the hub to rotate upon the axle and the arm to fling particulates outwardly, wherein the arm includes at least a blade that is in a plane axial to the hub.

16. Intake air cleaning apparatus comprising:
(a) a filter canister having an inlet end with an air inlet opening therein and an outlet end with an air outlet opening therein, the filter canister having a cylindrical outer wall, an inlet end wall mounted to one end of the cylindrical outer wall and defining the inlet end with the inlet opening therein, wherein the inlet end wall of the canister slopes upwardly from a junction with the outer cylindrical wall of the canister to a central circular opening defining the inlet opening of the canister, and an outlet end wall mounted to the other end of the cylindrical outer wall and defining the outlet end with the outlet opening therein;
(b) a filter mounted in the canister to filter the air flowing from the inlet opening to the outlet opening of the canister, wherein the filter is cylindrical and has a closed top end and an open bottom end which is in communication with the outlet opening of the canister, an outermost surface of the cylindrical filter spaced inwardly from the cylindrical outer wall of the canister to define an air space that is in communication with the inlet opening of the canister such that air flowing into the inlet opening of the canister flows into the air space and thence through the cylindrical filter to the outlet opening of the canister;
(c) a hood mounted to the filter canister at the inlet end and having a discharge port for discharging particulates, the hood and inlet end of the filter canister defining an air space, and a circumferential gap between the hood and the filter canister through which air flows into the air space, and a series of vanes mounted in the gap at an angle between radial and tangential to define channels between them through which air is directed into the air space; and
(d) a rotor assembly that is rotatably mounted within the air space to fling particulates toward the hood for expulsion through the discharge port.

17. The intake air cleaning apparatus of claim 16 wherein the cylindrical wall of the canister is formed in two separable parts comprising an upper section and a lower section and including means for releasably joining the upper section and the lower section.

18. The intake air cleaning apparatus of claim 16 wherein the inlet end wall is curved and slopes inwardly and upwardly from a junction with the cylindrical outer wall to a central circular opening defining the inlet opening of the canister.

19. The intake air cleaning apparatus of claim 16 wherein the filter comprises an outer cylindrical coarse filter having an outer surface and an inner surface and a cylindrical inner filter having an outer surface of a diameter smaller than that of the inner surface of the outer filter, the inner filter having a cylindrical interior which is mounted in communication with the outlet opening of the canister.

20. The intake air cleaning apparatus of claim 19 wherein the outer cylindrical filter has an open circular bottom which is engageable with an inner surface of the outlet wall of the canister to provide an air seal and further having a top wall closing the top end of the outer cylindrical filter so that air entering the canister from the inlet opening flows through the outer cylindrical filter and thence through the inner cylindrical filter and thence to the outlet opening of the canister.

21. The intake air cleaning apparatus of claim 20 wherein the top wall of the outer cylindrical filter has a central peak and slopes downwardly therefrom to direct air flowing into the canister through the inlet opening outwardly to the air space between the outer surface of the outer cylindrical filter and the inner surface of the cylindrical wall of the canister.

22. The intake air cleaning apparatus of claim 16 wherein the filter has a top wall at its top end, wherein the inlet end wall of the canister has standoffs extending downwardly therefrom and the top wall of the filter has upright extensions thereon with receptacles in each extension into which the standoffs are engaged to provide support for the filter at its top end.

* * * * *